April 11, 1961 A. ZAVROTSKY 2,978,816
GREATEST COMMON DIVISOR FINDER
Filed Feb. 4, 1960 2 Sheets-Sheet 1

INVENTOR
A. ZAVROTSKY
ATTORNEYS

April 11, 1961   A. ZAVROTSKY   2,978,816
GREATEST COMMON DIVISOR FINDER
Filed Feb. 4, 1960   2 Sheets-Sheet 2

INVENTOR
A. ZAVROTSKY
ATTORNEYS

United States Patent Office 2,978,816
Patented Apr. 11, 1961

2,978,816
GREATEST COMMON DIVISOR FINDER
Andrés Zavrotsky, Universidad de Los Andes, Merida, Venezuela
Filed Feb. 4, 1960, Ser. No. 6,650
2 Claims. (Cl. 35—31)

This invention relates to a mathematical demonstration device or a teaching device to demonstrate an optical or graphic determination of the greatest common divisor of two numbers, and to the method of determining the greatest common divisor by means of the device.

An object of the invention is to provide a device for demonstration, in the teaching of mathematics, that numbers may be subjected to geometrical, or graphical analysis.

A further object of the invention is to provide a method of determining the greatest common divisor of any two numbers.

Other and further objects and advantages will become apparent from the following description taken with the accompanying drawings, in which like characters of reference refer to similar parts in the several views, and in which.

Figure 1:
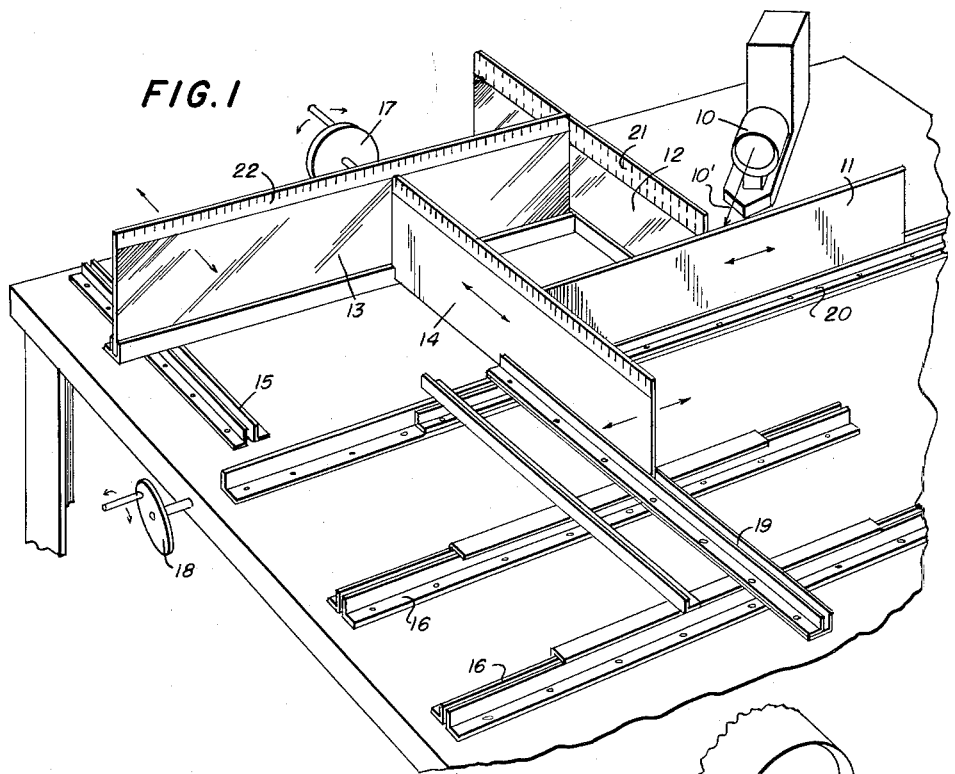
Fig. 1 is a general perspective view of the device.
Figure 2:
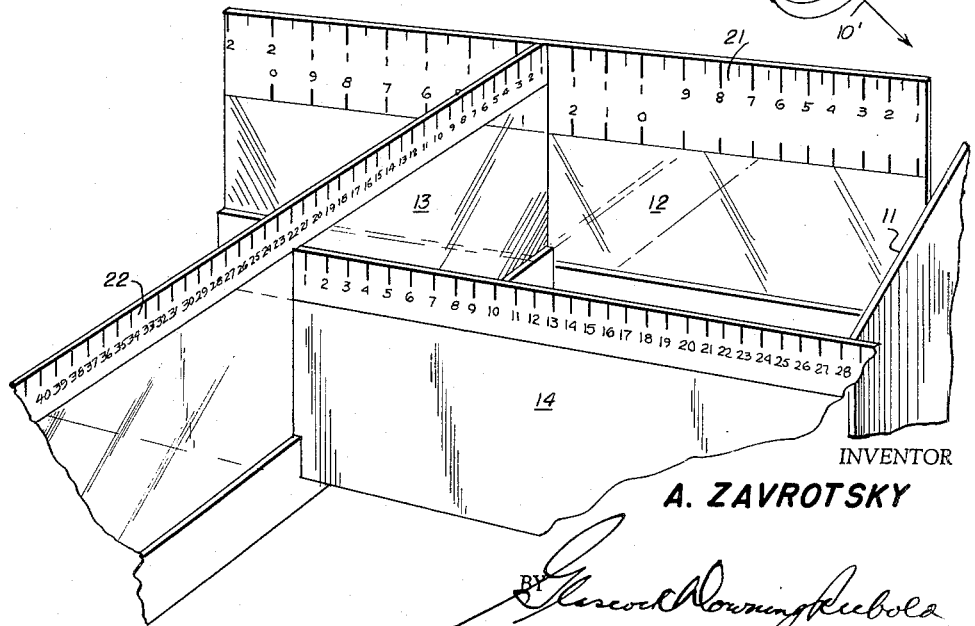
Fig. 2 is an enlarged fragmentary perspective view similar to Fig. 1 but from a different point of view.

One example of an arrangement of the invention is seen in Fig. 1 where 10 designates a source of light that may conveniently be a slide projector or the like, arranged to transmit preferably a small pencil of light.

The pencil of light designated by the arrow as 10' is placed in such a position that it impinges on a mirror 11 at an angle of 45° to the plane of the mirror. Mirror 11 forms one side of a rectangle bounded by mirrors 11, 12, 13 and 14. Mirror 12, in the example shown, is stationary and the plane of mirror 12 intersects the plane of mirror 11 at the point at which the pencil of light 10' impinges on mirror 11. The pencil of light, it will be noted, therefore makes an angle of 45° with the back of mirror 12.

Mirrors 13 and 14 are movable parallel to themselves along tracks 15 and 16. Adjustment of the position of the mirrors is accomplished by hand wheels 17 and 18 using screw and nut means (not shown) or any other conventional means.

As mirror 13 advances parallel to itself along track 15, it pushes mirror 14 so that mirror 14 moves longitudinally in guide 19. Similarly, as mirror 14 advances parallel to itself along track 16, it pushes mirror 11 so that mirror 11 moves longitudinally in guide 20. Thus it will be seen that by adjusting the positions of mirrors 13 and 14 a rectangular space is bounded by mirrors 11, 12, 13 and 14.

Along the outside of each of the mirrors a scale is provided solely as an aid to accurate positioning of the mirrors. On the inside of each of the mirrors there are provided scales 21, 22 that are in units of twice the length of the units of the scales on the outside of the mirrors; that it, if the scales on the outside are in centimeters, scales 21, 22 are in units two centimeters long. The numbering on the scales on the inside of the rectangle starts at the corner where the pencil of light 10' impinges on mirror 11. Mirror 12 does not quite contact mirror 11 so that a slit is provided to permit the pencil of light to enter the rectangular space bounded by mirrors 11, 12, 13 and 14.

The pencil of light impinging in mirror 11 at 45° at the exact corner of rectangle, 11, 12, 13, 14 will enter the rectangle at 45° to walls 11 and 12. The pencil of light will then strike successive mirrors at 45° until finally the pencil of light impinges on a corner where two of the mirrors intersect.

Figure 3:
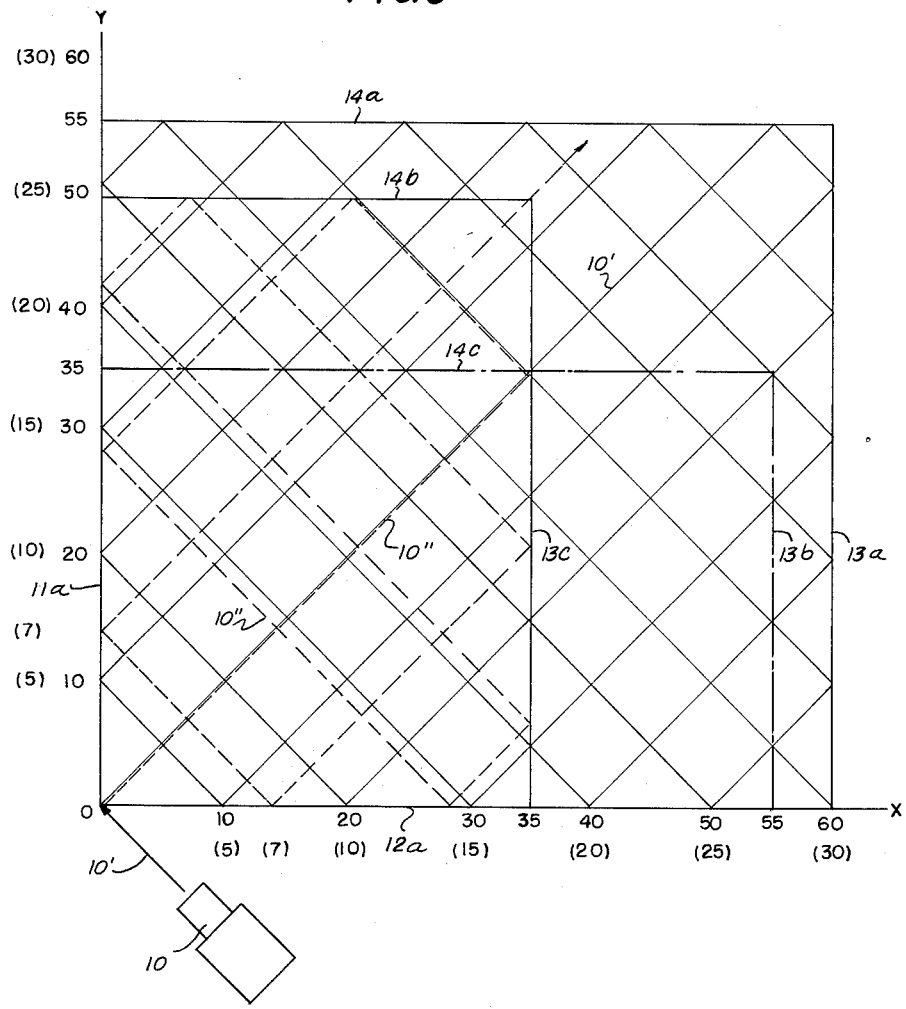
Fig. 3 is a diagram illustrating the path of light within the device under two different settings.

Turning now to Fig. 3, coordinates ox and oy represent mirrors 12a and 11a, respectively. A pencil of light 10' impinges on 11a at an angle of 45° and is reflected from surface 11a at 45° into rectangle 11a, 12a, 13a, 14a. This pencil of light will strike surface 14a and be reflected to 13a, 12a, 11a, etc. until it finally strikes the corner of the rectangle where 12a and 13a meet.

Now the dimensions of rectangle 11a, 12a, 13a, 14a is 55 units by 60 units, as indicated by the scale along lines oy and ox. The pencil of light strikes line ox, for instance (and also oy) at 10, 20, 30 etc. of the scale of actual size of the rectangle.

Now as was pointed out above, the scale on the inner surface uses as a unit two of the actual dimension units so the pencil of light will illuminate 5 the greatest common divisor of 55 and 60, and multiples of 5.

Now if the mirrors are adjusted so that the rectangle 11a, 12a, 13c, 14b in Fig. 3 is formed by the mirrors the pencil of light 10" entering the rectangle will impinge on side 13c, then on 14b, 11a, 12a, etc. until it finally strikes the corner between sides 13c and 14b. The number 7 on the scale on the inner surface of the rectangle will be illuminated. This is the greatest common divisor between 35 and 49 which are the actual unit dimensions of the rectangle.

In a rectangle 11a, 12a, 13b and 14c the pencil of light will illuminate 5 on the interior of the rectangle which is the greatest common divisor between 35 and 55.

Where the dimensions of the rectangle are prime the greatest common divisor is 1.

*Proof*

Let us call the set of all points of the Euclidean plane whose both Cartesian coordinates are integers the "lattice." Let us consider in this plane the rectangle $$0 \leqslant x \leqslant a; \ 0 \leqslant y \leqslant b$$

No generality is lost assuming $b$ is smaller than $a$, so that $b$ is breadth, and $a$ the length of the rectangle.

Let us consider a straight line issued from the origin and bisecting the angle between the two axes in the interior of the rectangle. Assume that whenever this straight line reaches any one of the sides of the rectangle, it is reflected according to the law of the reflection of light, as many times as necessary until it reaches one of the three remaining corners of the rectangle. Let us call the broken line thus constructed the "optical billiard," and study its properties in brief.

The projection of any rectilinear segment of the optical billiard on any one of the coordinate axes equals the length of the segment projected times $\cos 45° = \sqrt{2}$; therefore, the part of the optical billiard contained between 2 successive points of reflection in two longitudinal walls (the part which may consist either of one rectilinear segment, or of two, if between them the ray is reflected from one transverse wall), equals $b\sqrt{2}$. Likewise, the length of the part of the optical billiard between two successive points of intersection from two transverse walls (which necessarily consists at least of two rectilineal segments), equals $a\sqrt{2}$.

Conversely, each time as the ray of light has run, counting from the origin, a whole multiple of the distance $b\sqrt{2}$, it hits one of the longitudinal walls, and when it reaches the length of an integer multiple of $a\sqrt{2}$, it hits one of the two transverse walls. Now, whenever it reaches one of the three remaining corners of the rectangle, it hits at the same time a longitudinal wall and a transverse one, which proves:

*Theorem I.*—The total length of the optical billiard equals the least common multiple of $a$ and $b$, times $\sqrt{2}$.

*Theorem II.*—The optical billiard can only contain those lattice points for which $x \equiv y$ (mod. 2).

Proof: Let us call the initial segment of the optical billiard that one which is issued from the origin. Along this segment $x = y$, therefore $x \equiv y$ (mod. 2), thus the congruence which we want to prove is still true in the first point of reflection. Let us assume inductively that this congruence is still true for the $n$th point of reflection and let us prove that it is still valid for the whole segment joining it to the $(n+1)$th point of reflection. If this segment is perpendicular to the initial segment, then along it $x+y$ remains constant and therefore even, as it is in the $n$th point of reflection; but if $x+y \equiv 0$ (mod. 2), then $x \equiv y$ (mod. 2). And if this segment is parallel to the initial segment, then its equation is $x - x_0 = y - y_0$ (where $x_0$ and $y_0$ are the coordinates of the $n$th point of reflection), whence $x - y = x_0 - y_0 \equiv 0$. Therefore, in all cases $x \equiv y$ (mod. 2), which completes the induction.

Let us now turn to the particular case when G.C.D. of $a$ and $b$ is one. In this case the L.C.M. equals their product so that the total length of the optical billiard equals $ab\sqrt{2}$. The numbers $a$ and $b$ cannot in this case be both even. If $a$ is even and $b$ odd, then the only corner, besides the origin, in which $x \equiv y$ (mod. 2), is the end of the longitudinal wall adjacent to the origin. If $a$ is odd and $b$ even, then the only corner which satisfies this condition is the end of the transversal wall adjacent to the origin. If both $a$ and $b$ are odd, it is the corner diagonally opposed to the origin. Applying now the Theorem II, we have:

*Theorem III.*—If $a$ and $b$ are prime to each other, and if one of them is even and the other odd, then the end of the optical billiard is in the extreme of that wall adjacent to the origin, whose distance from the origin is an even number. If both $a$ and $b$ are odd, then the end of the optical billiard is in the corner diagonally opposed to the origin, tertium non datur.

It will be easier to visualize this theorem if the rectangle be painted like a chessboard in such a way that the unit square adjacent to the origin remains white. Then all squares in whose lower left corner $x \equiv y$ (mod. 2), are white and the rest black. In this case the Theorem III has the following:

*Corollary.*—A necessary and sufficient condition that the end of the optical billiard be in the corner diagonally opposed to the origin, is that the square lying in this corner be white. If this square is black, the optical billiard ends in that one of the other two corners, which contains a black square (there will always be one and only one such corner). As before, tertium non datur.

We have seen that if $a$ and $b$ are prime to each other the total length of the optical billiard is $ab\sqrt{2}$. But $ab$ is just the number of unit squares within the rectangle, while $\sqrt{2}$ is the length of the diagonal of each one. Now Theorem II forbids that the optical billiard may contain both diagonals of the same unit square: for the congruence $x \equiv y$ (mod. 2) is always satisfied in two and only two corners of a unit square. Thus the optical billiard contains one and just one diagonal of each unit square, viz. the ascending one of each white square and the descending one of each black square. This proves:

*Theorem IV.*—The successive points of reflection of the optical billiard from any one of the walls of the rectangle are just 2 units apart.

Let us now change the scale along both axes of coordinates in the same ratio $d$ (an integer). In the new scale the dimensions of the rectangle are $A = ad$; $B = bd$. This change of scale does not affect the form of the optical billiard, but the numbers A and B which now express the dimensions of the rectangle are no more prime to each other: their G.C.D. is $d$. So the Theorem IV now acquires the following wording:

*Theorem V.*—The successive points of reflection of the optical billiard from any one of the walls of the rectangle are twice the G.C.D. $(a; b)$ apart from one another.

If, therefore, one of the walls adjacent to the origin is provided with windows 2 units from the origin and from one another, and these windows are closed with shutters which are also mirror-like, so that when all shutters are closed the whole wall acts as a single mirror. If we then open the windows one by one, starting from the origin, then the number of the first window through which the light is seen expresses the greatest common divider of the numbers which give the length and the breadth of the rectangle.

Now the dimensions of the rectangle have been chosen in Fig. 3 to be in whole numbers, assume that the while numbers were measured in centimeters. Now assume, without moving the sides of the rectangle, that the dimensions be measured in inches. We see then that the device of the present invention will give the greatest common divisor of any two numbers.

What is claimed is:

1. A device to determine the greatest common divisor of two numbers, comprising four mirrors arranged to form the four sides of a rectangle of a length and breadth measured in units corresponding to the two numbers, one of said mirrors being at one end spaced slightly from the surface of the adjacent mirror to provide a slot at the corner of the rectangle, means to produce a pencil of light, said means to produce a pencil of light being so positioned exteriorly of said rectangle that said pencil of light impinges on said adjacent mirror in the plane of said one mirror at an angle of 45°, and means to measure the distance from said point of impingement of said pencil of light on said adjacent mirror to the point closest thereto illuminated by said pencil of light measured in units twice the units used in determining the lengths of the sides of said rectangle.

2. The device of claim 1, in which two of the mirrors are mounted for movement parallel to themselves with relation to the fourth mirror, whereby the dimensions of the rectangle may be varied.

References Cited in the file of this patent

UNITED STATES PATENTS 2,759,267    Wood et al. _____ Aug. 21, 1956